United States Patent [19]

Inata et al.

[11] 4,291,152

[45] Sep. 22, 1981

[54] PROCESS FOR PRODUCING AROMATIC POLYESTERS HAVING INCREASED DEGREES OF POLYMERIZATION

[75] Inventors: Hiroo Inata, Hino; Shunichi Matsumura, Hachioji; Makoto Ogasawara, Hino, all of Japan

[73] Assignee: Teijin Limited, Osaka, Japan

[21] Appl. No.: 133,797

[22] Filed: Mar. 25, 1980

[30] Foreign Application Priority Data

Mar. 27, 1979 [JP] Japan .................................. 54/35010
May 14, 1979 [JP] Japan .................................. 54/57985
Jun. 22, 1979 [JP] Japan .................................. 54/78009

[51] Int. Cl.³ ...................... C08G 63/44; C08G 73/16
[52] U.S. Cl. ............................ 528/289; 260/45.8 NZ; 525/437; 528/274
[58] Field of Search ................ 528/274, 289; 525/437; 260/45.8 NZ

[56] References Cited

U.S. PATENT DOCUMENTS

| | | | |
|---|---|---|---|
| 3,433,770 | 3/1969 | Shima et al. | 528/305 X |
| 3,444,141 | 5/1969 | Shima | 528/309 X |
| 3,553,157 | 1/1971 | Diskstra et al. | 528/309 X |
| 3,637,910 | 1/1972 | Shima | 525/444 |
| 3,714,125 | 1/1973 | Shima et al. | 528/296 X |
| 3,787,370 | 1/1974 | Shima et al. | 528/274 |
| 3,984,379 | 10/1976 | Oka et al. | 528/274 |

*Primary Examiner*—Lucille M. Phynes
*Attorney, Agent, or Firm*—Sherman & Shalloway

[57] ABSTRACT

A process for producing an aromatic polyester having an increased degree of polymerization. The process comprises reacting a hydroxyl-terminated, substantially linear, fiber-forming aromatic polyester having an aromatic dicarboxylic acid as a main acid component at an elevated temperature with a bi-cyclic imino ester compound of formula [I] or formula [II]. According to the process, the molecular chains of the aromatic polyester are bonded to each other by the terminal hydroxyl groups thereof to form rapidly the aromatic polyester having an increased degree of polymerization.

26 Claims, No Drawings

PROCESS FOR PRODUCING AROMATIC POLYESTERS HAVING INCREASED DEGREES OF POLYMERIZATION

This invention relates to a process for producing aromatic polyesters. More specifically, this invention relates to a process for producing aromatic polyesters having increased degrees of polymerization rapidly which comprises reacting an aromatic polyester with a bis-cyclic imino ester compound to bond the molecular chains of the polyester to each other by its terminal hydroxyl groups.

Known methods for rapidly increasing the degrees of polymerization of an aromatic polyester includes, for example, the reaction of an aromatic polyester having a relatively low molecular weight with a diaryl carbonate such as diphenyl carbonate under reduced pressure in the molten state (see U.S. Pat. No. 3,444,141); the reaction of an aromatic polyester with a diaryl ester of an aromatic dicarboxylic acid such as diphenyl terephthalate (see U.S. Pat. No. 3,433,770), the reaction of an aromatic polyester with a diaryl ester of oxalic or malonic acid (see U.S. Pat. No. 3,433,770); the reaction of an aromatic polyester with a polyalkylene oxalate such as polyethylene oxalate (see U.S. Pat. No. 3,637,910); and the reaction of an aromatic polyester with an orthoaryl ester of an aromatic or aliphatic dicarboxylic acid (see U.S. Pat. No. 3,984,379).

All of the aforesaid polymerization promotors generate by-products such as carbon dioxide gas or phenols upon reaction with the aromatic polyesters, and it is necessary in these prior techniques to remove these byproducts rapidly out of the reaction system by performing the reaction under reduced pressure in the molten state. If the by-product phenols remain in the reaction system, they will react with the ester groups of the molecular chains of the aromatic polyester to cause a decrease in the degree of polymerization of the aromatic polyester. Furthermore, if the polyalkylene oxalate is used as a polymerization promotor, it undergoes an esterinterchange reaction with the aromatic polyester to decrease the degree of polymerization of the aromatic polyester.

On the other hand, polymerization promotors are known which do not generate such by-products but are incorporated in the molecular chains of the polymer. Diepoxy compounds are typical examples of such polymerization promotors (see U.S. Pat. No. 3,553,157). Since a diepoxy compound forms two hydroxyl groups when linking the molecular chains of a polyester, the polycondensation reaction further proceeds through these hydroxyl groups resulting in the formation of a branched polyester.

A method is also known which comprises crosslinking with a bis-cyclic imino ester a powder coating material composed of polymer chains having more than two hydroxyl groups on an average in the molecular chains, which is of a low molecular weight and when baked, gives a melt having a very low viscosity under heat, thereby forming a network which becomes a coated film (see DT-OS No. 2,522,192).

It is an object of this invention to produce rapidly an aromatic polyester having an increased degree of polymerization by bonding the molecular chains of the aromatic polyester to each other by the terminal hydroxyl groups thereof.

Another object of this invention is to provide a process for producing rapidly an aromatic polyester having an increased degree of polymerization without substantial formation of by-products and without substantially involving side-reactions by using a polymerization promotor which reacts with the molecular chains of an aromatic polyester substantially only at the terminal hydroxyl groups thereof at an elevated reaction temperature, and which after the reaction, does not form any substantial by-product.

Still another object of this invention is to provide a process which can rapidly give an aromatic polyester having an increased degree of polymerization by performing the reaction not only under reduced pressure but also at atmospheric pressure or at elevated pressures.

Yet another object of this invention is to provide a process in which a reaction to bond the molecular chains of an aromatic polyester to each other is carried out in a melt-molding machine to produce an aromatic polyester having the desired increased degree of polymerization and a molded article made of the aromatic polyester.

A further object of this invention is to provide a substantially linear aromatic polyester having a high degree of polymerization, and a molded article of the aromatic polyester.

Other objects and advantages of this invention will becomes apparent from the following description.

According to the most basic concept of this invention, the objects and advantages of this invention can be achieved by a process for producing an aromatic polyester having an increased degree of polymerization, which comprises reacting a hydroxyl-terminated, substantially linear, fiber-forming aromatic polyester having an aromatic dicarboxylic acid as a main acid component at an elevated temperature with a bis-cyclic imino ester compound of the formula

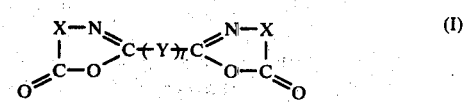

wherein Y represents a divalent hydrocarbon group which may further contain a hetero atom, X represents a divalent hydrocarbon group which contains 1 or 2 carbon atoms as members of the above imino ester ring and is non-reactive under the reaction conditions, and l is 0 or 1, or of the following formula

wherein A represents a grouping of the formula

in which R² represents a monovalent hydrocarbon group, or a grouping of the formula

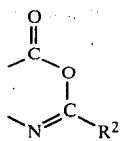 (II)-b in which R² is as defined above, R represents a tetravalent aromatic group which may further contain a hetero atom, and R¹ represents a monovalent aromatic hydrocarbon which is identical to or different from R²; thereby bonding the molecular chains of the aromatic polyester to each other by the terminal hydroxyl groups thereof and forming rapidly said aromatic polyester having an increased degree of polymerization.

The present invention is described in greater detail below.

[A] STARTING AROMATIC POLYESTERS

Aromatic polyesters which are used in this invention have terminal hydroxyl groups and are substantially linear and fiber-forming, with an aromatic dicarboxylic acid as a main acid component. These aromatic polyesters and processes for production thereof are known from many techniques which have so far been accummulated in the art.

These aromatic polyesters are derived from an aromatic dicarboxylic acid as a main acid component and an alkylene glycol or both an alkylene glycol and a polyoxyalkylene glycol as a main glycol component.

Examples of aromatic dicarboxylic acids are terephthalic acid, isophthalic acid, naphthalenedicarboxylic acid, diphenyldicarboxylic acid, diphenylsulfonedicarboxylic acid, diphenoxyethanedicarboxylic acid, diphenyletherdicarboxylic acid, methylterephthalic acid, and methylisophthalic acid.

Examples of the alkylene glycols are polymethylene glycols having 1 to 10 carbon atoms such as ethylene glycol, trimethylene glycol, tetramethylene glycol, hexamethylene glycol and dexamethylene glycol, and cyclohexane dimethylol.

Examples of the polyoxyalkylene glycols are polyoxyethylene glycol, polyoxypropylene glycol, polyoxytrimethylene glycol, polyoxytetramethylene glycol, and copolymerized polyoxyalkylene glycols having at least two of these oxyalkylene units as recurring units.

The aromatic polyesters having an aromatic dicarboxylic acid as a main acid component and an alkylene glycol as a main glycol component are homopolymers or copolymers derived from at least one aromatic dicarboxylic acid exemplified above as the main acid component and at least one alkylene glycol exemplified above as the main glycol component, and include, for example, polyethylene terephthalate, polytrimethylene terephthalate, polytetramethylene terephthalate, polyethylene-2,6-naphthalenedicarboxylate, and polyethylene terephthalate-isophthalate.

Aromatic polyesters derived from an aromatic dicarboxylic acid as a main acid component and an alkylene glycol and a polyoxyalkylene glycol as a main glycol component are generally called "polyester elastomers" because of their high elasticity. They are copolymers derived from at least one aromatic dicarboxylic acid exmplified above as the acid component and at least one alkylene glycol exemplified above and at least one polyoxyalkylene glycol exemplified above as the main glycol component. For example, there can be cited a polyester elastomer having terephthalic acid as the acid component and tetramethylene glycol and polyoxytetramethylene glycol as the glycol component.

Polyester elastomers in which the polyoxyalkylene glycol has an average molecular weight of 500 to 5,000, preferably 600 to 4,000, especially preferably 800 to 3,000. Also, advantageously used are polyester elastomers in which the proportion of the polyoxyalkylene moiety attributed to the polyoxyalkylene glycol used is 5 to 85% by weight, preferably 10 to 80% by weight, especially preferably 15 to 75% by weight, based on the polyester elastomer.

The aromatic polyesters that can be used in this invention are not limited to those derived from aromatic dicarboxylic acids as the acid component and alkylene glycols or both alkylene glycols and polyoxyalkylene glycols as the glycol component, and may include those which are derived from these compounds as the main component and other subsidiary components.

Examples of such subsidiary components include acid components, for example aliphatic dicarboxylic acids such as succinic acid, adipic acid, sebacic acid, decanedicarboxylic acid and dodecanedicarboxylic acid, alicyclic dicarboxylic acids such as cyclohexanedicarboxylic acid, δ-hydroxycaproic acid, hydroxybenzoic acid and hydroxyethoxybenzoic acid; trifunctional or higher compounds such as trimethylol propane, pentaerythritol, trimellitic acid and pyromellitic acid; and monofunctional compounds such as benzoylbenzoic acid and diphenylcarboxylic acid.

The subsidiary acid component may be included in an amount of not more than 20 mole%, preferably not more than 15 mole%, especially preferably not more than 10 mole%, based on the total acid component. The trifunctional or higher compound may be incorporated in an amount of usually not more than 1 mole% of the total acid component, in which amount the aromatic polyester is maintained substantially linear. The use of monofunctional compounds which block terminal hydroxyl groups is insignificant unless there is some special reason. But those which block terminal carboxyl groups can be used without any substantial influence on the reaction of this invention.

Preferred aromatic polyesters used in this invention are a polyester derived from terephthalic acid as a main acid component and ethylene glycol or tetramethylene glycol as a main glycol component, and a polyester derived from terephthalic acid as a main acid component and tetramethylene glycol and polytetramethylene glycol as a main glycol component.

These aromatic polyesters can be produced by an ester-interchange method or a direct polymerization method in the presence of known catalysts in a manner known per se. For example, a polyester elastomer can be produced by heating an aromatic dicarboxylic acid or its ester-forming derivative and tetramethylene glycol and polytetramethylene glycol in the presence of a titanium catalyst such as titanium tetrabutoxide to 180° to 250° C., and then gradually increasing the degree of pressure reduction.

That the aromatic polyester used in this invention has terminal hydroxyl groups should not be construed to mean that all terminal groups are hydroxyl groups, nor that the concentration of the terminal hydroxyl groups is higher than that of terminal carboxyl groups. As stated in detail hereinbelow, the reaction in accordance with this invention results in bonding of the molecular chains of the aromatic polyester to each other by the terminal hydroxyl groups. Hence, with the progress of the reaction, the degree of polymerization of the aromatic polyester increases rapidly, and when the desired degree of polymerization is reached, the resulting aromatic polyester can still have terminal hydroxyl groups in sufficient concentrations.

The hydroxyl-terminated aromatic polyester used in this invention can be easily obtained as a polyester having more terminal hydroxyl groups than terminal carboxyl groups by using a stoichiometrically larger amount of the glycol component than the acid component in the polyester-forming reaction system.

The preferred concentration of terminal hydroxyl groups is at least 50 equivalent%, preferably at least 60 equivalent%, especially at least 70 equivalent%, based on the total amount of terminal groups.

The "fiber-forming" property of the polyester denotes its property of being molded into fibrous form as a result of having some degree of polymerization, irrespective of the properties, etc. of the resulting fibers. Accordingly, solution viscosity, which depends upon the degree of polymerization, can be a measure of the fiber-forming property of the aromatic polyester. Advantageously used in this invention as the starting fiber-forming aromatic polyester are an aromatic polyester derived from an aromatic dicarboxylic acid as the main acid component and ethylene glycol as the main glycol component and having an intrinsic viscosity, measured in ortho-chlorophenol at 35° C., of at least 0.3, preferably at least 0.4, and a polyester elastomer derived from an aromatic dicarboxylic acid as the main acid component and an alkylene glycol and a polyoxyalkylene glycol as the main glycol component and having a reduced viscosity ($\eta_{sp}/c$), measured at 35° C. for a solution of polymer in ortho-chlorophenol in a concentration (c) of 1.2 g/dl, of at least 0.5, preferably at least 0.6, above all at least 0.8. From the viewpoint of the properties, uses, etc. of the resulting aromatic polyesters with an increased degree of polymerization, the starting aromatic polyesters desirably have a melting point of at least 200° C.

[B] bis-CYCLIC IMINO ESTERS

The bis-cyclic imino esters used in this invention are represented by the following formula

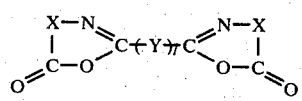
(I)

or the following formula

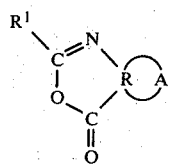
(II)

wherein A represents a grouping of the formula

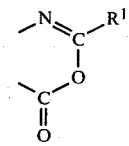
(II)-a or a grouping of the formula

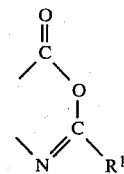
[II]-b

In formula [I], Y represents a divalent hydrocarbon group, which may further contain a hetero atom; X represents a divalent hydrocarbon group which contains 1 or 2 carbon atoms as members of the above imino ester ring and is non-reactive under the reaction conditions; and l is 0 or 1.

In formula [II], R represents a tetravalent aromatic group which may further contain a hetero atom, and $R^1$ and $R^2$ are identical or different and represent a monovalent hydrocarbon group.

The divalent hydrocarbon group (Y in formula [I]) which may contain a hetero atom is a divalent hydrocarbon group which preferably contains 1 to 3 hetero atoms such as nitrogen, oxygen or sulfur, preferably oxygen or sulfur. It may contain a substituent which is non-reactive with the aromatic polyester under the reaction conditions. Examples of such a divalent hydrocarbon group are alkylene groups containing 1 to 10 carbon atoms, arylene groups having 6 to 12 carbon atoms, cycloalkylene groups having 5 to 12 carbon atoms, alkylene-arylene-alkylene groups having 8 to 20 carbon atoms, and these groups in which 1 to 3 carbon atoms are substituted by hetero atoms. Examples of the aforesaid non-reactive substituent are alkyl groups having 1 to 10 carbon atoms, aryl groups having 6 to 12 carbon atoms, cycloalkyl groups having 5 to 12 carbon atoms, and aralkyl groups having 8 to 20 carbon atoms.

Specific examples of preferred divalent hydrocarbon groups include alkylene groups having 1 to 10 carbon atoms such as methylene, ethylene, trimethylene, tetramethylene, pentamethylene, hexamethylene, octamethylene, nonamethylene, dexamethylene and dimethylmethylene; arylene groups having 6 to 12 carbon atoms such as phenylene, naphthylene, diphenylene, groups of the formula

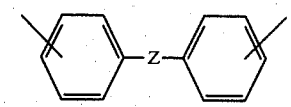

wherein Z is —O—, —CO—, —S—, —SO$_2$—, —CH$_2$—, —CH$_2$CH$_2$, or —C(CH$_3$)$_2$—; cycloalkylene groups having 5 to 12 carbon atoms such as cyclopentylene, cyclohexylene and cyclododecamethylene; and alkylene-arylene-alkylene groups having 8 to 20 carbon atoms such as p-xylylene and m-xylylene. Of these, the alkylene and arylene groups are especially preferred.

Specific examples of preferred substituents include alkyl groups having 1 to 10 carbon atoms such as methyl, ethyl, propyl, hexyl and decyl; aryl groups having 6 to 12 carbon atoms such as phenyl and naphthyl; cycloalkyl groups having 5 to 12 carbon atoms such as cyclopentyl and cyclohexyl; and aralkyl groups having 8 to 20 carbon atoms such as phenethyl. Of these, the alkyl and aryl groups are preferred.

Examples of the divalent hydrocarbon group (X in formula [I]) which contains 1 or 2 carbon atoms as members of the imino ester group are a methylene group, an ethylene group, an ortho-phenylene group, and these groups substituted by substituents which are non-reactive under the reaction conditions. Examples of these substituents may include the same substituents exemplified above with regard to Y. Two substituents which may be attached to the ortho-phenylene group may be linked to each other to form a ring. Of these, substituted methylene, substituted ethylene, and ortho-phenylene are preferred, and the ortho-phenylene is especially preferred.

In formula [I], l is 0 or 1, and when l is 0, formula [I] means that the two cyclic imino ester groups are directly bonded to each other.

Examples of preferred tetravalent aromatic groups (R in formula [II]) which may further contain a hetero atom are monocyclic, fused ring or polycyclic tetravalent aromatic groups of the formulae

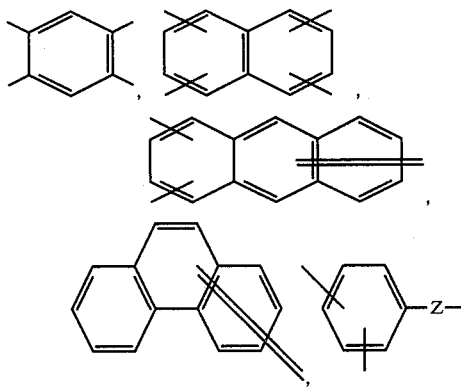

wherein Z is as defined hereinabove. Of these,

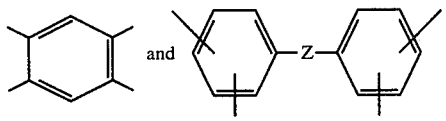

are preferred. These aromatic groups may be substituted with the same substituents as exemplified hereinabove with regard to Y.

Examples of preferred monovalent hydrocarbon groups represented by $R^1$ and $R^2$ in formula [II] include alkyl groups having 1 to 10 carbon atoms, cycloalkyl groups having 5 to 12 carbon atoms, and aryl groups having 6 to 18 carbon atoms. The alkyl groups having 1 to 10 carbon atoms are especially preferred.

Specific examples of preferred species of these groups are the same as those given hereinabove.

As stated hereinabove, A in formula [II] is expressed by the formula [II]-a or [II]-b. The groups of formulae [II]-a and [II]-b are quite the same, and are bonded to R in formula [II] in opposite directions. Accordingly, it is obvious to those skilled in the art that when R in formula [II] is the group

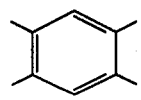

the compound of formula [II] is represented either by the formula

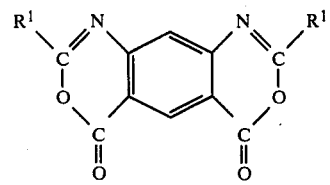

(wherein A is the group of formula [II]-a) or by the formula

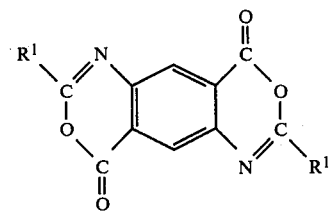

(wherein A is the group of formula [II]-b). These two compounds are quite different from each other, but can both be used in this invention.

When R is formula [II] is, for example, a group of the formula

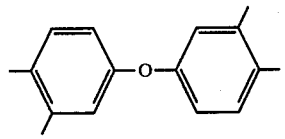

the ether linkage (—O—) is capable of free rotation. In this case, therefore, a compound of formula [II] in which A is the group of formula [II]-a is quite the same as a compound of formula [II] in which A is the group of formula [II]-b.

Specific examples of preferred compounds of formula [I] are listed below. These compounds are called bisoxazolones when X is a hydrocarbon group having one carbon atom as a member of the ring (i.e., when the imino-ester rings are 5-membered), and bisoxazinones when X is a hydrocarbon group having two ring carbon atoms (i.e., when the imino ester rings are 6-membered).

BISOXAZOLONES 2,2'-bis(5(4H)-oxazolone),
2,2'-methylenebis(5(4H)-oxazolone),
2,2'-ethylenebis(5(4H)-oxazolone),
2,2'-tetramethylenebis(5(4H)-oxazolone),
2,2'-hexamethylenebis(5(4H)-oxazolone),
2,2'-decamethylenebis(5(4H)-oxazolone),
2,2'-p-phenylenebis(5(4H)-oxazolone),
2,2'-m-phenylenebis(5(4H)-oxazolone), 2,2'-naphthalenebis(5(4H)-oxazolone),
2,2'-diphenylenebis(5(4H)-oxazolone),
2,2'-(1,4-(cyclohexylene)-bis(5(4H)-oxazolone),
2,2'-bis(4-methyl-5(4H)-oxazolone),
2,2'-methylenebis(4-methyl-5(4H)-oxazolone),
2,2'-ethylenebis(4-methyl-5(4H)-oxazolone),
2,2'-tetramethylenebis(4-methyl-5(4H)-oxazolone),
2,2'-hexamethylenebis(4-methyl-5(4H)-oxazolone),
2,2'-decamethylenebis(4-methyl-5(4H)-oxazolone),
2,2'-p-phenylenebis(4-methyl-5(4H)-oxazolone),
2,2'-m-phenylenebis(4-methyl-5(4H)-oxazolone),
2,2'-naphthalenebis(4-methyl-5(4H)-oxazolone),
2,2'-diphenylenebis(4-methyl-5(4H)-oxazolone),
2,2'-(1,4-cyclohexylene)-bis(4-methyl-5(4H)-oxazolone),
2,2'-bis(4,4-dimethyl-5(4H)-oxazolone),
2,2'-methylenebis(4,4-dimethyl-5(4H)-oxazolone),
2,2'-ethylenebis(4,4-dimethyl-5(4H)-oxazolone),
2,2'-tetramethylenebis(4,4-dimethyl-5(4H)-oxazolone),
2,2'-hexamethylenebis(4,4-dimethyl-5(4H)-oxazolone),
2,2'-octamethylenebis(4,4-dimethyl-5(4H)-oxazolone),
2,2'-decamethylenebis(4,4-dimethyl-5(4H)-oxazolone),
2,2'-p-phenylenebis(4,4-dimethyl-5(4H)-oxazolone),
2,2'-m-phenylenebis(4,4-dimethyl-5(4H)-oxazolone),
2,2'-naphthalenebis(4,4-dimethyl-5(4H)-oxazolone),
2,2'-diphenylenebis(4,4-dimethyl-5(4H)-oxazolone),
2,2'-(1,4-cyclohexylene)-bis(4,4-dimethyl-5(4H)-oxazolone),
2,2'-bis(4-isopropyl-5(4H)-oxazolone),
2,2'-methylenebis(4-isopropyl-5(4H)-oxazolone),
2,2'-ethylenebis(4-isopropyl-5(4H)-oxazolone),
2,2'-tetramethylenebis(4-isopropyl-5(4H)-oxazolone),
2,2'-hexamethylenebis(4-isopropyl-5(4H)-oxazolone),
2,2'-p-phenylenebis(4-isopropyl-5(4H)-oxazolone),
2,2'-m-phenylenebis(4-isopropyl-5(4H)-oxazolone),
2,2'-naphthalenebis(4-isopropyl-5(4H)-oxazolone),
2,2'-bis(4-isobutyl-5(4H)-oxazolone),
2,2'-methylenebis(4-isobutyl-5(4H)-oxazolone),
2,2'-ethylenebis(4-isobutyl-5(4H)-oxazolone),
2,2'-tetramethylenebis(4-isobutyl-5(4H)-oxazolone),
2,2'-hexamethylenebis(4-isobutyl-5(4H)-oxazolone),
2,2'-p-phenylenebis(4isobutyl-5(4H)-oxazolone),
2,2'-m-phenylenebis(4-isobutyl-5(4H)-oxazolone), and
2,2'-naphthalenebis(4-isobutyl-5(4H)-oxazolone).

BISOXAZINONES 2,2'-bis(3,1-benzoxazin-4-one),
2,2'-methylenebis(3,1-benzoxazin-4-one),
2,2'-ethylenebis(3,1-benzoxazin-4-one),
2,2'-tetramethylenebis(3,1-benzoxazin-4-one),
2,2'-hexamethylenebis(3,1-benzoxazin-4-one),
2,2'-decamethylenebis(3,1-benzoxazin-4-one),
2,2'-p-phenylenebis(3,1-benzoxazin-4-one),
2,2'-m-phenylenebis(3,1-benzoxazin-4-one),
2,2'-naphthalenebis(3,1-benzoxazin-4-one),
2,2'-(4,4'-diphenylene)bis(3,1-benzoxazin-4-one),
2,2'-(1,4-cyclohexylene)bis(3,1-benzoxazin-4-one),
2,2'-bis(4,5-dihydro-1,3,6H-oxazin-6-one),
2,2'-methylenebis(4,5-dihydro-1,3,6H-oxazin-6-one),
2,2'-ethylenebis(4,5-dihydro-1,3,6H-oxazin-6-one),
2,2'-tetramethylenebis(4,5-dihydro-1,3,6H-oxazin-6-one),
2,2'-p-phenylenebis(4,5-dihydro-1,3,6H-oxazin-6-one),
2,2'-m-phenylenebis(4,5-dihydro-1,3,6H-oxazin-6-one),
2,2'-bis(4-methyl-5-hydro-1,3,6H-oxazin-6-one),
2,2'-ethylenebis(4-methyl-5-hydro-1,3,6H-oxazin-6-one),
2,2'-p-phenylenebis(4-methyl-5-hydro-1,3,6H-oxazin-6-one),
2,2'-m-phenylene(4-methyl-5-hydro-1,3,6H-oxazin-6-one),
2,2'-p-phenylenebis(4-hydro-5-methyl-1,3,6H-oxazin-6-one), and
2,2'-m-phenylenebis(4-hydro-5-methyl-1,3,6H-oxazin-6-one).

These bisoxazolones and bisoxazinones of formula [I] can be easily prepared by reacting N,N'-diacylbis(α- or β-aminocarboxylic acids) of the formula

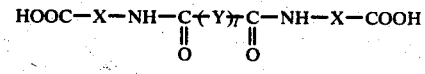

wherein X, Y and l are as defined hereinabove, with dehydrating agents such as acetic anhydride to induce intramolecular dehydration.

Examples of preferred compounds of formula [II] are given below. These compounds are called bisbenzoxazinones.

BISBENZOXAZINONES 2,8-Dimethyl-4H,6H-benzo[1,2-d:5,4-d']bis-[1,3]-oxazine-4,6-dione,
2,7-dimethyl-4H,9H-benzo[1,2-d:4.5-d']bis[1,3]-oxazine-4,9-dione,
2,8-diphenyl-4H,8H-benzo[1,2-d:5,4-d']bis-[1,3]-oxazine-4,6-dione,
2,7-diphenyl-4H,9H-benzo[1,2-d:4,5-d']bis-[1,3]-oxazine-4,6-dione,
6,6'-bis(2-methyl-4H,3,1-benzoxazin-4-one),
6,6'-bis(2-ethyl-4H,3,1-benzoxazin-4-one),
6,6'-bis(2-phenyl-4H,3,1-benzoxazin-4-one),
6,6'-methylenebis(2-methyl-4H,3,1-benzoxazin-4-one),
6,6'-methylenebis(2-phenyl-4H,3,1-benzoxazin-4-one),
6,6'-ethylenebis(2-methyl-4H,3,1-benzoxazin-4-one),
6,6'-ethylenebis(2-phenyl-4H,3,1-benzoxazin-4-one),
6,6'-butylenebis(2-methyl-4H,3,1-benzoxazin-4-one),
6,6'-butylenebis(2-phenyl-4H,3,1-benzoxazin-4-one),
6,6'-oxybis(2-methyl-4H,3,1-benzoxazin-4-one),
6,6'-oxybis(2-phenyl-4H,3,1-benzoxazin-4-one),
6,6'-sulfonylbis(2-methyl-4H,3,1-benzoxazin-4-one),
6,6'-sulfonylbis(2-phenyl-4H,3,1-benzoxazin-4-one),
6,6'-carbonylbis(2-methyl-4H,3,1-benzoxazin-4-one),
6,6'-carbonylbis(2-phenyl-4H,3,1-benzoxazin-4-one),
7,7'-methylenebis(2-methyl-4H,3,1-benzoxazin-4-one),
7,7'-methylenebis(2-phenyl-4H,3,1-benzoxazin-4-one),
7,7'-bis(2-methyl-4H,3,1-benzoxazin-4-one),
7,7'-ethylenebis(2-methyl,4H,3,1-benzoxazin-4-one),
7,7'-oxybis(2-methyl-4H,3,1-benzoxazin-4-one),
7,7'-sulfonylbis(2-methyl-4H,3,1-benzoxazin-4-one), and
7,7'-carbonylbis(2-methyl-4H,3,1-benzoxazin-4-one).

The bisbenzoxazinones of formula [II] can be easily prepared by condensing aromatic diaminodicarboxylic acids of the following formula

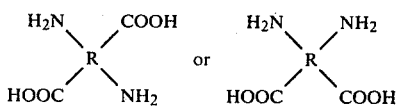

wherein R is as defined hereinabove, with the reactive derivatives, preferably acid anhydrides or acid halides of monocarboxylic acids expressed by the following formula

R¹—COOH                     (5)

wherein R¹ is as defined hereinabove, in an inert organic solvent or polyphosphoric acid.

The bis-cyclic imino esters of formulae [I] and [II] in this invention may be used singly or in a combination of two or more.

[C] REACTIONS AND REACTION CONDITIONS

The process of this invention is performed by reacting the aforesaid aromatic polyester with the bis-cyclic imino ester at an elevated temperature. As a result of the reaction, the molecular chains of the aromatic polyester are bonded to each other by its terminal hydroxyl groups to rapidly form an aromatic polyester having an increased degree of polymerization, as shown by the following reaction schemes (1) and (2). The reaction scheme (1) represents the reaction of polyethylene terephthalate with 2,2'-bis(3,1-benzoxazin-4-one), and the reaction scheme (2) represents the reaction of polyethylene terephthalate with 2,8-dimethyl-4H,6H-benzo(1,2-d:5,4-d')bis(3,1)-oxazine-4,6-dione.

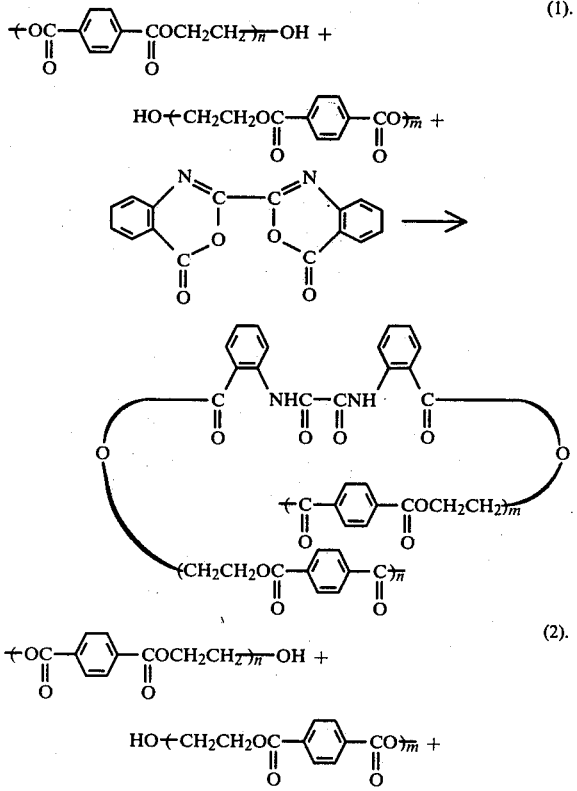

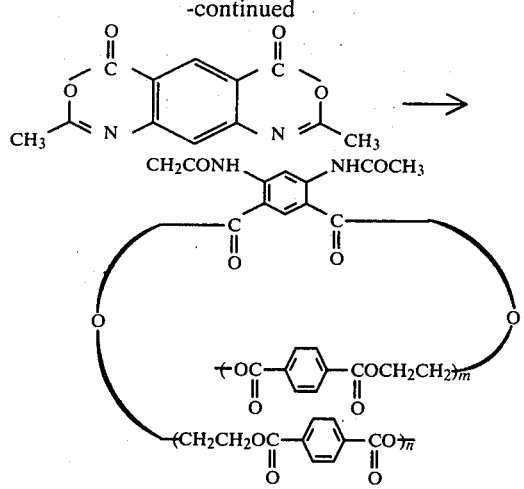

In the reaction schemes (1) and (2), n and m represent the number of ethylene terephthalate units, namely the degree of polymerization. It is clear from the reaction schemes that the reaction in accordance with this invention induces the bonding of the molecular chains of the aromatic polyesters to each other by the terminal hydroxyl groups. Thus, it is seen that an aromatic polyester molecular chain having a degree of polymerization of (m+n) can be obtained from an aromatic polyester molecular chain having a degree of polymerization of n and an aromatic polyester molecular chain having a degree of polymerization of m, and therefore, an aromatic polyester having an increased degree of polymerization can be rapidly produced.

As is clearly seen from the above reaction schemes, an amide linkage forms in the resulting aromatic polyester molecular chains. The aromatic polyester molecular chains obtained by the reaction scheme (1) have an amide linkage in the main chain, and the aromatic polyester molecular chains obtained in accordance with the reaction scheme (2) gives an aromatic polyester having an amide group as a pendant group. But both of these reactions proceed in the same mode in that the molecular chains of the aromatic polyester are bonded to each other by the terminal hydroxyl groups, forming an amide linkage.

In the process of this invention, the aforesaid reactions proceed at an elevated temperature. Specifically, at an elevated temperature, the aromatic polyester and the bis-cyclic imino ester are intimately contacted with each other in the solid phase or in the molten state.

In the reaction performed in the molten state, the aromatic polyester is brought into intimate contact with the bis-cyclic imino ester at a temperature at which at least the aromatic polyester is melted, or at a higher temperature.

The reaction temperature is generally above the melting point of the aromatic polyester but not exceeding 380° C., preferably at least a temperature 10° C. higher than the melting point of the aromatic polyester but not exceeding 350° C., especially preferably at least a temperature 15° C. higher than the melting point of the aromatic polyester but not exceeding 330° C.

The reaction can be performed at elevated, atmospheric or reduced pressures. The reaction in accordance with this invention proceeds very rapidly. It is sufficient to carry it out for about 15 minutes after the molten aromatic polyester and bis-cyclic imino ester contact each other intimately. Investigations of the present inventors have shown that the reaction in accordance with this invention may sometimes come to completion within a period of as short as about 30 seconds to give an aromatic polyester having the desired increased degree of polymerization.

The reaction time required in the process of this invention accounts for the very rapid proceeding of the reaction. In actual operations, however, it is permissible to mix the molten aromatic polyester and bis-cyclic imino ester for a longer period of time than the above-mentioned reaction time, and in some cases, this is preferred. In practice, therefore, the reaction time is generally from about 30 seconds to about 60 minutes, preferably from about 1 minute to about 30 minutes, especially preferably from about 2 minutes to about 15 minutes.

The reaction is preferably carried out in an inert atmosphere, for example in a nitrogen atmosphere.

The reaction in accordance with this invention in which the aromatic polyester is in the molten state may be carried out in any reaction apparatus which can afford a reaction system capable of maintaining the aromatic polyester in the molten state. For example, the reaction can be carried out in a polycondensation reactor for aromatic polyesters, or in a melt-molding machine.

In the polycondensation reactor, the reaction can be performed by adding a predetermined amount of the bis-cyclic imino ester to the molten aromatic polyester resulting from the polycondensation has such a degree of polymerization which renders it fiber-forming. In the melt-molding machine, a separately prepared mixture of the aromatic polyester and a predetermined amount of the bis-cyclic imino ester is fed and reacted. Or the aromatic polyester and a predetermined amount of the bis-cyclic imino ester are separately charged into the melt-molding machine, and then reacted there.

When the reaction is carried out in the polycondensation reactor, an aromatic polyester having an increased degree of polymerization can be obtained by the process of this invention. When the resulting aromatic polyester is to be molded into various articles such as fibers or films, it is melted in the melt-molding machine.

On the other hand, when the reaction is carried out in the melt-molding machine, molded articles of an aromatic polyester having an increased degree of polymerization can be obtained from the aromatic polyester material only by a melt-molding operation.

It is possible also to perform the reaction of this invention in a polymerization reactor, and subject the resulting aromatic polyester having an increased degree of polymerization further to the reaction of this invention in a melt-molding machine.

Or the aromatic polyester having an increased degree of polymerization obtained by performing the reaction of this invention in the melt-molding machine may be stored as a molding material without directly molding it in the melt-molding machine, and may be melted and molded in the melt-molding machine as required.

The reaction in accordance with this invention may also be carried out in the solid phase. This reaction is carried out by first producing an intimate mixture of the aromatic polyester and the bis-cyclic imino ester, and then heating the mixture to a temperature below the melting point of the aromatic polyester.

The reaction is carried out preferably at a temperature from a point about 80° C. lower than the melting point of the aromatic polyester to its melting point at atmospheric pressure or under reduced pressure, preferably in an inert atmosphere such as nitrogen.

The intimate mixture of the aromatic polyester and the bis-cyclic imino ester may be prepared, for example, by melting and mixing the aromatic polyester and the bis-cyclic imino ester under conditions such that not all of the bis-cyclic imino ester is reacted (for example by mixing them under the pre-mixing conditions to be described hereinbelow); or by contacting the aromatic polyester with the bis-cyclic imino ester at a temperature above the melting point of the bis-cyclic imino ester; or by impregnating the aromatic polyester with a solution of the bis-cyclic imino ester in an organic solvent capable of dissolving the bis-cyclic imino ester, such as an aromatic hydrocarbon (e.g., toluene, xylene).

The reaction of this invention in the solid phase is advantageous when it is carried out after the aromatic polyester has been molded into fibers, films, etc. In this case, the molding conditions for ordinary aromatic polyesters can be used, and there is no need to use molding conditions for polyethylene terephthalate of a high degree of polymerization represented by an intrinsic viscosity of at least 1.0. By subjecting the resulting molded articles to the reaction of this invention, molded articles composed of an aromatic polyester having an increased degree of polymerization can be easily obtained.

Stoichiometrically, the reaction in accordance with this invention proceeds between 2 equivalents of the terminal hydroxyl groups of the aromatic polyester and 1 mole of the bis-cyclic imino ester, as is clearly seen from the reaction schemes (1) and (2) given hereinabove.

The process of this invention, however, is directed to the production of an aromatic polyester having an increased degree of polymerization, and not all of the terminal hydroxyl groups of the aromatic polyesters used need to react with the bis-cyclic imino ester. Accordingly, even when a stoichiometrical amount of the bis-cyclic imino ester is used with regard to the terminal hydroxyl groups of the aromatic polyester, or, of course, when the bis-cyclic imino ester is used in an amount smaller than its stoichiometrical amount with regard to the terminal hydroxyl groups of the aromatic polyester, not all of the terminal hydroxyl groups of the aromatic polyester are consumed by the process of this invention. On the other hand, when the bis-cyclic imino ester is used in an amount in excess of its stoichiometrical amount with respect to the terminal hydroxyl groups of the aromatic polyester, and all of these terminal hydroxyl groups are consumed, the bis-cyclic imino ester partly remains unreacted in the resulting aromatic polyester having an increased degree of polymerization.

The process of this invention essentially embraces the aforesaid embodiments.

The process of this invention is performed by using the bis-cyclic imino ester preferably in a proportion of 0.05 to 2 moles, more preferably 0.1 to 1 mole, per equivalent of the terminal hydroxyl groups of the aromatic polyester.

From the reaction of polyethylene terephthalate with 2,2'-bis(3,1-benzoxazin-4-one), a typical bis-cyclic imino ester, for example, the present inventors have ascertained that generally up to about 70% of the entire hydroxyl groups of the aromatic polyester used can contribute to the bonding of the molecular chains of the aromatic polyester to each other if a sufficient length of the reaction period and an optimal amount of the bis-cyclic imino ester are given.

[D] EMBODIMENTS OF THE PRESENT INVENTION

The essence of the present invention lies in the production of a substantially linear aromatic polyester having an increased degree of polymerization by reacting the terminal hydroxyl groups of the molecular chains of the aromatic polyester with the bis-cyclic imino ester.

For example, there are the following embodiments using the reaction of this invention.

(1) Embodiment in which the aromatic polyester and the bis-cyclic imino ester are directly used as starting materials.

(2) Embodiment in which the aromatic polyester and a thermoplastic resin containing the bis-cyclic imino ester in the unreacted state and/or in the form of an end blocking agent are used as starting materials.

(3) Embodiment in which the aromatic polyester is reacted with a carboxyl content reducing agent yielding terminal hydroxyl groups upon reaction with terminal carboxyl groups thereby to convert the terminal carboxyl groups of the aromatic polyester to terminal hydroxyl groups, and then the product is subjected to the reaction of this invention to bond the molecular chains of the polyester to each other by the terminal hydroxyl groups.

These embodiments are described in detail below.

EMBODIMENT (1)

As stated hereinbefore, this embodiment embraces a method for reacting the aromatic polyester with the bis-cyclic imino ester in the molten state in a polymerization reactor or a melt-molding machine, or reacting them in the solid phase, to produce an aromatic polyester having an increased degree of polymerization, or molded articles therefrom.

This is a typical embodiment of the process of this invention already described hereinabove.

This embodiment also includes a method in which the aromatic polyester and the bis-cyclic imino ester are intimately pre-mixed, and the resulting mixture is reacted in the molten state within the melt-molding machine.

Such pre-mixing can be achieved by using the bis-cyclic imino ester in an amount at least equimolar to the equivalent of the terminal hydroxyl groups of the polyester to be mixed and suitably adjusting the melt-mixing time.

Many experiments by the present inventors have led to the discovery that such mixing can be achieved by mixing the polyester and the bis-cyclic imino ester so that the mixing temperature (T, °C.) and the mixing time (t, second) have the relation expressed by the following equations.

$$\log t \leq -0.008T + 4.8$$

preferably $$\log t \leq -0.008T + 4.4$$

more preferably $$\log t \leq -0.008T + 4.2$$

above all $$\log t \leq -0.008T + 4.0$$

Thus, according to the aforesaid pre-mixing method, there can be obtained a pre-mixed polymer containing the cyclic imino ester groups in a proportion of at least 10 equivalents/$10^6$ g of polymer, preferably at least 20 equivalents/$10^6$ g of polymer, more preferably at least 30 equivalents/$10^6$ g of polymer.

The content of the cyclic imino ester groups of the resulting pre-mixed polymer, when the polymer is, for example, polyethylene terephthalate, can be determined by extrapolation from a calibration curve prepared in advance on the basis of (X–Y) in which X and Y are as follows:

The polymer is dissolved at 210° C. for 2 minutes in benzyl alcohol containing about 20 ppm of water, and the solution is neutralized and titrated with a 0.1 N sodium hydroxide-benzyl alcohol solution using Phenol Red as an indicator. The amount of titration obtained is X.

The polymer is dissolved in a mixture of phenol and tetrachloroethane, and the solution is neutralized and titrated with a 0.1 N sodium hydroxide-benzyl alcohol solution using Tetrabromophenolphthalein Blue as an indicator. The amount of titration obtained is Y.

EMBODIMENT (2)

According to this embodiment, the bis-cyclic imino ester used in the reaction is included in a thermoplastic resin in the unreacted state or in the form of an end blocking agent, and the aromatic polyester are melted to bond the molecular chains of the aromatic polyester by the terminal hydroxyl groups, thereby to produce an aromatic polyester having an increased degree of polymerization or molded articles thereof which contain the aforesaid thermoplastic resin. Accordingly, this method can be conveniently used in a method, called a master batch method, in which a thermoplastic resin containing a large amount of the cyclic imino esters capable of reacting with the terminal hydroxyl groups of the aromatic polyester is first prepared, and is as required, is mixed in a predetermined amount with the aromatic polyester.

The thermoplastic resin includes, for example, not only aromatic polyesters derived from aromatic dicarboxylic acids as a main acid component and alkylene glycols as a main glycol component, but also aliphatic polyesters derived from aliphatic dicarboxylic acids as a main acid component and alkylene glycols as a main glycol component, polycarbonates, polyamides, polyolefins, polyethers, and polysulfones.

The aliphatic dicarboxylic acids and alkylene glycols may be the same as those exemplified hereinabove. Specific examples of the other thermoplastic resins are polycarbonates derived from 2,2-bis(4-hydroxyphenyl)-propane or 1,1-bis(4-hydroxyphenyl)cyclohexane; polyolefins such as polyethylene, polypropylene, polystyrene or poly(trimethyl pentene-1); polyamides such as poly-$\epsilon$-capramide and polyhexamethylene adipamide; and polyethers such as polyoxyethylene glycol or polyoxytetramethylene glycol.

When the aromatic polyester has terminal hydroxyl groups, the bis-cyclic imino ester may react with the terminal hydroxyl groups. Accordingly, in the preparation of a master polyester consisting of the aromatic polyester or aliphatic polyester, preferably the aromatic polyester, and the bis-cyclic imino ester, it is generally important that the bis-cyclic imino ester should be included in the unreacted state, or in the form of an end blocking agent in which only one of the imino-ester groups reacts with the terminal hydroxyl groups, and the other remains unreacted. Such mixing can be achieved by using the bis-cyclic imino ester in an amount of at least equimolar to the equivalent of the terminal hydroxyl groups of the polyester to be mixed and suitably adjusting the melt-mixing time.

Such a mixing is desirably carried out under the conditions for the pre-mixing described hereinabove.

When other thermoplastic resins than the polyesters are used and they have terminal hydroxyl groups capable of reacting with the bis-cyclic imino ester, they may be mixed with each other in the same manner as described above. When the thermoplastic resins do not contain hydroxyl groups, a master polymer containing the bis-cyclic imino ester in the unreacted state can be more easily obtained.

Desirably, the master polymer is prepared in a melt-molding machine in an inert atmosphere at atmospheric pressure to elevated pressure.

The master polymer so produced is used in an amount corresponding to a predetermined amount of the cyclic imino ester, and is mixed and melted with the aromatic polyester having terminal hydroxyl groups at a temperature above the melting point of the aromatic polyester and the master polymer, preferably in a melt-molding machine. The mixture is then subjected to the reaction of this invention to afford an aromatic polyester having an increased degree of polymerization. Molded articles may be produced from the polyester obtained.

When other thermoplastic resins than the aromatic polyesters are used as the master polymer, the resulting aromatic polyester having an increased degree of polymerization or molded articles composed of it contain such other thermoplastic resins.

Generally, when the master polymer is used, it is desirable to include the cyclic imino ester in the master polymer in such an amount that the amount of the master polymer is at least 0.1 part by weight per part by weight of the aromatic polyester.

The content of the bis-cyclic imino ester is, for example, about 3 to about 100% by weight, preferably about 4 to about 50% by weight, more preferably about 5 to about 30% by weight, based on the thermoplastic resin.

EMBODIMENT (3)

The reaction of the present invention results in bonding of the terminal hydroxyl groups of the aromatic polyester to each other. Accordingly, aromatic polyesters having terminal hydroxyl groups in a high concentration are desirable starting materials in this invention. Generally, the content of terminal groups in a substantially linear polyester depends upon its degree of polymerization, and usually, a polyester in which all terminal groups are hydroxyl groups cannot be obtained.

According to this embodiment, therefore, there can be provided a method for rapidly performing the reaction of this invention by converting the terminal carboxyl groups of a fiber-forming aromatic polyester, for example having an intrinsic viscosity of at least 0.3, to hydroxyl groups thereby increasing the concentration of the hydroxyl groups.

In this embodiment of the invention, a substantially linear, fiber-forming aromatic polyester is reacted with the bis-cyclic imino ester and a carboxyl content reducing agent yielding terminal hydroxyl groups upon reaction with the terminal carboxyl groups.

Examples of the carboxyl content reducing agents are monoepoxy compounds, and decarboxylating-type carboxyl content reducing agents which react with carboxyl groups to form hydroxyl groups with the splitting off of carbon dioxide.

Specific examples of the monoepoxy compounds are N-glycidyl phthalimide, N-glycidyl-4-methylphthalimide, N-glycidyl-4,5-dimethylphthalimide, N-glycidyl-3-methylphthalimide, N-glycidyl-3,6-dimethylphthalimide, N-glycidyl-4-ethoxyphthalimide, N-glycidyl-4-chlorophthalimide, N-glycidyl-4,5-dichlorophthalimide, N-glycidyl-3,4,5,6-tetrabromophthalimide, N-glycidyl-4-n-butyl-5-bromophthalimide, N-glycidylsuccinimide, N-glycidyl hexahydrophthalimide, N-glycidyl-1,2,3,6-tetrahydrophthalimide, N-glycidyl maleinimide, N-glycidyl-$\alpha,\beta$-dimethylsuccinimide, N-glycidyl-$\alpha$-ethylsuccinimide, N-glycidyl-$\alpha$-propylsuccinimide, N-glycidyl benzamide, N-glycidyl-p-methylbenzamide, N-glycidyl naphthoamide, N-glycidyl stearamide, N-methyl-4,5-epoxycyclohexane-1,2-dicarboximide, N-ethyl-4,5-epoxycyclohexane-1,2-dicarboximide, N-phenyl-4,5-epoxycyclohexane-1,2-dicarbonimide, N-naphthyl-4,5-epoxycyclohexane-1,2-dicarboximide, N-tolyl-3-methyl-4,5-epoxycyclohexane-1,2-dicarboximide, ortho-phenyl phenol glycidyl ether, lauryl glycidyl ether, and 2-methyloctyl glycidyl ether. These monoepoxy compounds may be used singly or as mixtures of two or more.

Generally, the monoepoxy compound is used in an amount of 0.1 to 10% by weight, preferably 0.2 to 5% by weight, more preferably 0.3 to 3% by weight.

Examples of the decarboxylating-type carboxyl content reducing agents are alkylene carbonates such as ethylene carbonate, dialkyl oxalates such as diethyl oxalate, poly(alkylene oxalates) such as poly(ethylene oxalate), and polyalkylene malonates such as polyethylene malonate.

These decarboxylating-type carboxyl content reducing agents are described in U.S. Pat. Nos. 3,637,910, 3,714,125 and 3,787,370, and suitable amounts of these are also described therein. Accordingly, these patent specifications have been cited herein as reference.

When a monoepoxy compound is used in this embodiment, it is possible to first react the aromatic polyester with the monoepoxy compound and then react the resulting product with the bis-cyclic imino ester. It is also possible to add the monoepoxy compound and the bis-cyclic imino ester to the aromatic polyester and to perform the reaction between the monoepoxy compound and the carboxyl groups and the reaction of bonding the hydroxyl groups simultaneously. The reaction using the monoepoxy compound has the advantage that no volatile by-product is formed, and therefore, the reaction can be performed, for example, in a melt-molding machine at atmospheric pressure to elevated pressures.

When the decarboxylating-type carboxyl content reducing agent is used, it is preferred to first react the aromatic polyester with the decarboxylating-type carboxyl content reducing agent, and after the carboxyl content reducing reaction is substantially over, to add the bis-cyclic imino ester to the reaction system and perform the reaction of bonding the terminal hydroxyl groups. Accordingly, in this embodiment of the invention, too, it is desirable, as is well known, to perform the carboxyl content reducing reaction under reduced pressure, preferably in a polymerization reactor.

Thus, according to this invention, an aromatic polyester having an increased degree of polymerization can be produced rapidly from an aromatic polyester having terminal hydroxyl groups.

The process of this invention is favorably applied to the production of aromatic polyesters having high degrees of polymerization as can be seen from the fact that, for example, in a melt-molding machine, polytetramethylene terephthalate having an intrinsic viscosity of 1.24 can be produced by reacting polytetramethylene terephthalate having an intrinsic viscosity of 0.72 in accordance with this invention at 240° C. for 2 minutes. The absolute value of the degree of polymerization of aromatic polyesters obtained by the process of this invention, however, is not limited in any way by such a specific example.

The following Examples illustrate the present invention without any intention of limiting it thereby.

In these Examples, all parts are by weight. The terminal hydroxyl groups and carboxyl group contents of aromatic polyesters are measured in accordance with the method of A. Conix [Makromol. Chem. 26, 226 (1958)].

EXAMPLES 1 TO 12 AND COMPARATIVE EXAMPLE 1

One hundred parts of chips (dried in hot air at 140° C. for 2 hours) of polytetramethylene terephthalate having an intrinsic viscosity of 0.72 and containing terminal hydroxyl groups in a concentration of 88% based on the entire terminal groups was mixed with a predetermined amount of each of the bis-cyclic imino esters shown in Table 1 by using a V-type blender. The mixture was melt-extruded at each of the polymer temperatures and average residence times indicated in Table 1. The intrinsic viscosities of each of the resulting polymers are shown in Table 1.

Table 1 also shows the intrinsic viscosity of a polymer obtained by melt-extruding the same polytetramethylene terephthalate as described above except that no bis-cyclic imino ester was added (Comparative Example 1).

It is seen from the results of Table 1 that the bis-cyclic imino ester reacts with the polyester at the time of melt-extrusion to increase its degree of polymerization markedly within a short period of time.

TABLE 1

| Example | Melt-extruding conditions Temp. of polymer (°C.) | Average residence time (°C.) | bis-cyclic imino ester (parts) | Intrinsic viscosity of the polymer after extrusion |
|---|---|---|---|---|
| 1 | 240 | ca. 2 | 2,2'-p-phenylenebis(4,4-dimethyl-5(4H)-oxazolone) (0.6) | 0.99 |
| 2 | 240 | ca. 2 | 2,2'-p-phenylenebis(4,4-dimethyl-5(4H)-oxazolone) (1.0) | 1.17 |
| 3 | 240 | ca. 2 | 2,2'-p-phenylenebis(4,4-dimethyl-5(4H)-oxazolone) (1.3) | 1.23 |
| 4 | 240 | ca. 2 | 2,2'-p-phenylenebis(4-isobutyl-5(4H)-oxazolone) (1.0) | 1.15 |
| 5 | 240 | ca. 2 | 2,2'-p-phenylenebis(4-isobutyl-5(4H)-oxazolone) (1.5) | 1.24 |
| 6 | 240 | ca. 2 | 2,2'-p-phenylenebis(5(4H)-oxazolone) (1.3) | 1.11 |
| 7 | 240 | ca. 2 | 2,2'-n-phenylenebis(4,4-dimethyl-5(4H)-oxazolone) (1.0) | 1.08 |
| 8 | 245 | ca. 3 | 2,8-dimethyl-4H,6H-benzo(1,2-d:5,4-d')bis(1,3)oxazine-4,6-dione (1.0) | 1.10 |
| 9 | 245 | ca. 3 | 2,7-dimethyl-4H,9H-benzo(1,2-d:4,5-d)bis(1,3)oxazine-4,9-dione (1.0) | 1.06 |
| 10 | 245 | ca. 3 | 6,6'-methylenebis(2-methyl-4H,3,1-benzoxazinon-4-one) (1.5) | 0.93 |
| 11 | 245 | ca. 3 | 6,6'-methylenebis(2-phenyl-4H,3,1-benzoxazin-4-one) (2.0) | 0.85 |
| 12 | 245 | ca. 3 | 6,6'-bis(2-methyl-4H,3,1-benzoxazin-4-one) (1.3) | 0.98 |
| Comp. Ex. 1 | 245 | ca. 3 | None | 0.70 |

EXAMPLES 13 TO 21 AND COMPARATIVE EXAMPLE 2

One hundred parts of chips (dried in hot air at 160° C. for 2 hours) of polyethylene terephthalate having an intrinsic viscosity of 0.51 and containing terminal hydroxyl groups in a concentration of 88% based on the entire terminal groups was mixed with a predetermined amount of each of the bis-cyclic imino esters indicated in Table 2 by a V-type blender. The mixture was melt-extruded by an extruder at a temperature of about 265° C. with each of the average residence times shown in Table 2. The intrindic viscosity of each of the polymers after extrusion is shown in Table 2.

For comparison, the same polyethylene terephthalate as above except that no bis-cyclic imino ester was added was melt-extruded under the same conditions as above. The results are shown in Table 2.

The molecular weight distributions of polyethylene terephthalate having a high degree of polymerization (intrinsic viscosity 1.15) obtained in Example 17 and polyethylene terephthalate (intrinsic viscosity 0.49) obtained in Comparative Example 2 were measured by gel permeation chromatography. The $\overline{M}w/\overline{M}n$ value (in which $\overline{M}w$ represents the weight average molecular weight, and $\overline{M}n$, the number average molecular weight) was 2.9 for the polymer of Example 17, and 2.8 for the polymer of Comparative Example 2. It is clear from the result that the increase of the degree of polymerization obtained by using the cyclic imino ester is not due to such a reaction as branching.

TABLE 2

| Example | Average residence time (min.) | bis-cyclic imino ester (parts) | Intrinsic viscosity of the polymer after melt-extrusion |
|---|---|---|---|
| 13 | ca. 3 | 2,2'-p-phenylenebis(3,1-benzoxazin-4-one) (1.0) | 0.64 |
| 14 | ca. 3 | 2,2'-p-phenylenebis(3,1-benzoxazin-4-one) (2.0) | 0.73 |
| 15 | ca. 3 | 2,2'-tetramethylenebis(3,1-benzoxazin-4-one) (1.0) | 0.62 |
| 16 | ca. 3 | 2,2'-bis(3,1-benzoxazin-4-one) (1.0) | 0.96 |
| 17 | ca. 3 | 2,2'-bis(3,1-benzoxazin-4-one) (1.5) | 1.15 |
| 18 | ca. 5 | 2,7-dimethyl-4H,9H-benzo[1,2-d:4,5-d']bis[1,3]oxazine-4,9-dione (1.2) | 0.67 |
| 19 | ca. 5 | 6,6'-methylenebis(2-methyl-4H,3,1-benzoxazin-4-one) (1.5) | 0.62 |
| 20 | ca. 5 | 6,6'-bis(2-methyl-4H,3,1-benzoxazin-4-one) (1.4) | 0.63 |
| 21 | ca. 5 | 6,6'-oxybis(2-phenyl-4H,3,1-benzoxazin-4-one) (1.8) | 0.59 |
| Comp. Ex. 2 | ca. 5 | None | 0.49 |

EXAMPLE 22

One hundred parts of chips of polyethylene terephthalate (intrinsic viscosity 0.54) having copolymerized therewith 15 mole%, based on the total acid component, of isophthalic acid was melted in a heated and stirred vessel in a stream of nitrogen at 260° C. To the molten polymer was added 1.5 parts of 6,6'-bis(2-methyl-4H,3,1-benzoxazin-4-one). The mixture was stirred and reacted. The intrinsic viscosity of the polymer increased to 0.58 in 5 minutes after the addition of the bis-cyclic imino ester compound, to 0.61 in 10 minutes, and also to 0.63 in 30 minutes.

EXAMPLE 23

A glass reactor equipped with a thermometer and a distilling device was charged with 38.4 parts of dimethyl terephthalate, 27.0 parts of tetramethylene glycol and 0.014 part of tetrabutyl titanate as a catalyst. The mixture was subjected to ester-interchange reaction to an esterification degree of about 80% while maintaining the reaction mixture at a temperature of not more than 220° C. A polymerization reactor equipped with a stirrer and a vacuum distilling device was internally purged with nitrogen, and the reaction product obtained was transferred into the polymerization reactor. It was polymerized for 15 minutes at atmospheric pressure, for another 15 minutes under a reduced pressure of about 20 mmHg, and further for 40 minutes under a high vacuum of 0.5 mmHg, while heating it with a heating medium at 240° C. The pressure of the reaction system was adjusted to normal atmospheric pressure using a stream of nitrogen, and under atmospheric pressure in a nitrogen stream, 0.44 part of 2,8-dimethyl-4H,6H-benzo[1,2-d:5,4-d']bis[1,3]oxazin-4,6-dione was added, and the mixture was further stirred. Before the addition of the bis-cyclic imino ester, polytetramethylene terephthalate had an intrinsic viscosity of 0.54. But its intrinsic viscosity increased to 0.66 in 2 minutes after the addition of the cyclic imino ester, to 0.82 in 5 minutes, and to 0.84 in 15 minutes.

EXAMPLE 24

One hundred parts of polytetramethylene terephthalate having an intrinsic viscosity of 0.83 and containing terminal hydroxyl groups in a concentration of 83% based on the entire terminal groups was melted in a polymerization reactor at 245° C. in a stream of nitrogen gas, and then 1.0 part of 2,2'-p-phenylenebis(3,1-benzoxazin-4-one) was added. The mixture was stirred. In 2 minutes, the intrinsic viscosity of polytetramethylene terephthalate became 1.02. In 5 minutes, its intrinsic viscosity reached 1.13 which was nearly an equilibrium value. The reaction was continued for 30 minutes, but its intrinsic viscosity remained almost unchanged at 1.12.

EXAMPLE 25

One hundred parts of polyhexamethylene terephthalate having an intrinsic viscosity of 0.64 and containing terminal hydroxyl groups in a concentration of 85% based on the entire terminal groups was melted in a polymerization reactor at 230° C. in a stream of nitrogen gas. Then, 0.7 part of 2,2'-phenylenebis[5(4H)-oxazolone] was added, and the mixture was stirred. The intrinsic viscosity of the polymer increased to 1.01 in 2 minutes, to 1.12 in 5 minutes, and to 1.15 in 10 minutes. When the reaction was continued, the intrinsic viscosity of the polymer scarcely changed.

EXAMPLE 26

One hundred parts of polytetramethylene terephthalate having an intrinsic viscosity of 0.75 and containing terminal hydroxyl groups in a concentration of 82% based on the entire terminal groups was melted in a polymerization vessel at 245° C. in a stream of nitrogen gas, and then 1.2 parts of 2,2'-bis(3,1-benzoxazin-4-one) was added. The mixture was stirred. In 3 minutes after initiation of the reaction, the intrinsic viscosity of the polyester increased to 1.22.

EXAMPLES 27 TO 30 AND COMPARATIVE EXAMPLE 3

A reactor equipped with a stirrer, a distilling device and a nitrogen introducing inlet was charged with 55.8 parts of dimethyl terephthalate, 38.8 parts of tetramethylene glycol, 90.8 parts of polyoxytetramethylene glycol having an average molecular weight of 2,000 (the proportion of the polyoxytetramethylene portion was 60% by weight based on the resulting polyester), and 0.025 part of tetrabutoxy titanate. The mixture was heated to 180° to 220° C. Methanol formed as a result of the reaction was distilled off. When about 90%, based on theory, of methanol was distilled off, the temperature was raised to 240° C., and the mixture was reacted for 30 minutes at atmospheric pressure. Then, the reaction was carried out for 30 minutes in a weak vacuum of about 30 mmHg ab., and the polymerization was carried out for 100 minutes in a high vacuum of 0.1 to 0.3 mmHg. The reduced viscosity of the polymer became 1.12.

The resulting polymer was pelletized to form chips, and dried. Then, the chips were dry-blended with a predetermined amount of each of the bisoxazinones shown in Table 3. The resulting mixture was melt-extruded by an extruder at a temperature of about 240° C. with an average residence time of about 3 minutes.

The reduced viscosity of the polymer after extrusion is shown in Table 3. The polymer was substantially free from coloration.

TABLE 3

| Example | Bisoxazinone | Amount added (wt. %) | Reduced viscosity of the polymer after extrusion |
|---|---|---|---|
| 27 | 2,2'-bis(benzoxazin-4-one) | 1.0 | 2.13 |
| 28 | 2,2'-bis(benzoxazin-4-one) | 1.5 | 2.64 |
| 29 | 2,2'-p-phenylenebis(benzo-xazin-4-one) | 1.5 | 1.72 |
| 30 | 2,2'-tetramethylenebis(benzo-xazin-4-one) | 1.5 | 1.65 |
| Comp. Ex. 3 | None | — | 1.08 |

For comparison, the reduced viscosity of the polymer not containing the bisoxazinone compound but subjected to the same procedure as above is also shown in Table 3.

It is seen from the results that the bisoxazinone reacted with the polyester elastomer at the time of extrusion to increase its degree of polymerization markedly within a short period of time.

EXAMPLES 31 TO 34 AND COMPARATIVE EXAMPLE 4

The same reactor as used in Examples 27 to 30 was charged with 97.0 parts of dimethyl terephthalate, 67.5 parts of tetramethylene glycol, 71.8 parts of polyoxytetramethylene glycol having an average molecular weight of 1500 and 0.07 part of titanium tetrabutoxide. They were reacted in the same way as in Examples 27 to 30 except that the reaction under a high vacuum was carried out for 120 minutes. Thus, a polyester elastomer having a reduced viscosity of 0.98 was obtained.

The resulting polymer was pelletized to form chips, and dried. The chips were then dry-blended with a predetermined amount of each of the bisoxazolines shown in Table 4 by a V-type blender. The mixture was extruded by an extruder at a polymer temperature of about 245° C. with an average residence time of about 3 minutes. The reduced viscosities of the polymers obtained are shown in Table 4.

For comparison, the above procedure was repeated except that no bisoxazolone was added. The results are also shown in Table 4.

TABLE 4

| Example | Bisoxazolone | Amount added (wt. %) | Reduced viscosity of the polymer after extrusion |
|---|---|---|---|
| 31 | 2,2'-p-phenylenebis[4,4-dimethyl-5(4H)-oxazolone] | 1.0 | 1.96 |
| 32 | 2,2'-p-phenylenebis[4,4-dimethyl-5(4H)-oxazolone] | 1.5 | 2.24 |
| 33 | 2,2'-p-phenylenebis[5(4H)-oxazolone] | 1.5 | 1.75 |
| 34 | 2,2'-p-phenylenebis[4-isobutyl-5(4H)-oxazolone] | 1.5 | 1.63 |
| Comp. Ex. 4 | None | — | 0.96 |

EXAMPLES 35 TO 37 AND COMPARATIVE EXAMPLE 5

The same reactor as used in Examples 27 to 30 was charged with 174.6 parts of dimethyl terephthalate, 23.0 parts of dimethyl sebacate, 135 parts of tetramethylene glycol, 95 parts of polyoxytetramethylene glycol having an average molecular weight of 1000 and 0.1 part of titanium tetrabutoxide. They were reacted in the same way as in Examples 27 to 30 to afford a polyester elastomer having a reduced viscosity of 1.02. Then, a predetermined amount of each of the bisbenzoxazinones indicated in Table 5 was added to the polymer, and the mixture was reacted with stirring at 245° C. and about 1 mmHg. ab. for 10 minutes. The reduced viscosity of each of the resulting polymers is shown in Table 5.

For comparison, the same procedure as above was repeated except that no bisbenzoxazinone was added. The results are also shown in Table 5.

TABLE 5

| Example | Bisbenzoxazinone | Amount added (wt. %) | Reduced viscosity of the polymer after the reaction |
|---|---|---|---|
| 35 | 2,8-dimethyl-4H,6H-benzo[1,2-d:5.4-d']bis[1,3]oxazine-4,6-dione | 1.5 | 1.82 |
| 36 | 6,6'-bis(2-methyl-4H,3,1-benzoxazin-4-one | 1.5 | 1.66 |
| 37 | 6,6'-methylenebis(3-methyl-4H,3,1-benzoxazin-4-one) | 2.0 | 1.70 |
| Comp. Ex. 5 | None | — | 0.98 |

EXAMPLES 38 TO 41 AND COMPARATIVE EXAMPLE 6

One part of N-glycidyl phthalimide as a monoepoxy compound was added to 100 parts of polyethylene terephthalate having an intrinsic viscosity of 0.50 and a terminal carboxyl group content of 20 equivalents/$10^6$ g. The mixture was reacted with stirring at 280° C. for 5 minutes in a stream of nitrogen gas. Then, a predetermined amount of each of the bisoxazinone compounds indicated in Table 6 was added and reacted. The intrinsic viscosities and terminal carboxyl contents of the resulting polymers are shown in Table 6.

TABLE 6

| | | In 10 minutes after addition of the bisoxazinone | | |
|---|---|---|---|---|
| Example | Type of bisoxazinone compound | Amount added (parts) | Intrinsic viscostiy | Terminal carboxyl content (equivalents/$10^6$ g) |
| 38 | 2,2'-bis(3,1-benzoxazin-4-one) | 1.5 | 1.15 | 8 |
| 39 | 2,2'-p-phenylenebis(3,1-benzoxazin-4-one) | 1.5 | 0.73 | 7 |
| 40 | 2,8-dimethyl-4H,6H-benzo[1,2-d:5,4-d']bis-[1,3]-oxazine-4,6-dione | 1.2 | 0.69 | 9 |
| 41 | 6,6'-methylenebis(2-methyl-4H,3,1-benzoxazin-4-one) | 1.5 | 0.65 | 8 |
| Comp. Ex. 6 | None | — | 0.48 | 22 |

For comparison, the above procedure was repeated except that the monoepoxy compound and the bisoxazinone compound were not added. The results are also shown in Table 6.

It is seen from the results given in Table 6 that the monoepoxy compound and the bisoxazinone compound reacted with the polyester in the molten state to reduce its terminal carboxyl group content and markedly increase its degree of polymerization within a short period of time.

EXAMPLES 42 TO 44 AND COMPARATIVE EXAMPLE 7

A predetermined amount of each of the monoepoxy compounds indicated in Table 7 was added to 100 parts of polytetramethylene terephthalate having an intrinsic viscosity of 0.72 and a terminal carboxyl group content of 46 equivalents/$10^6$ g, and they were reacted in a stream of nitrogen gas at 240° C. for 5 minutes. Then, a predetermined amount of each of the bisoxazolone compounds shown in Table 7 was added, and reacted. The intrinsic viscosities and the terminal carboxyl group contents of the resulting polymers are shown in Table 7.

For comparison, the above procedure was repeated except that the monoepoxy compound and the bisoxazolone compounds were not added. The results are also given in Table 7.

It is seen from Table 7 that the monoepoxy compound and the bisoxazolone compound reacted with polytetramethylene glycol in the molten state to reduce its terminal carboxyl group equivalent and increase its degree of polymerization markedly within a short period of time.

TABLE 7

| Example | Monoepoxy compound (parts) | Bisoxazolone compounds (parts) | In 5 minutes after the addition of the bisoxazolone compound | |
|---|---|---|---|---|
| | | | Intrinsic viscosity | Terminal COOH content (eq.$10^6$ g) |
| 42 | N-glycidyl phthalimide (1.5) | 2,2'-p-phenylene-bis[4,4-dimethyl-5(4H)-oxazolone] (1.3) | 1.14 | 11 |
| 43 | N-glycidyl hexahydrophthalimide (1.5) | 2,2'-p-phenylene-bis[4,4-dimethyl-5(4H)-oxazolone] (1.0) | 1.07 | 15 |
| 44 | N-phenyl-4,5-epoxycyclohexane-1,2-dicarboximide (1.5) | 2,2'-p-phenylene-bis[5(4H)-oxazolone] (1.3) | 1.03 | 14 |
| Comp. Ex. 7 | None | None | 0.70 | 56 |

EXAMPLE 45

One part of N-glycidyl phthalimide and 1 part of 2,2'-bis(3,1-benzoxazin-4-one) were added to 100 parts of polyethylene terephthalate having an intrinsic viscosity of 0.51 and a terminal carboxyl group content of 28 equivalents/$10^6$ g, and they were reacted in a stream of nitrogen gas at 280° C. In 10 minutes after the initiation of the reaction, the intrinsic viscosity of the polymer reacted 0.84, and its terminal carboxyl group content reached 13 equivalents/$10^6$ g.

EXAMPLES 46 TO 48 AND COMPARATIVE EXAMPLE 8

960 parts of polyethylene terephthalate having an intrinsic viscosity of 0.61 and a terminal carboxyl content of 33 equivalent/$10^6$ g was melted in a stream of nitrogen at about 280° C. in a polymerization reactor, and then 9.6 parts of polyethylene oxalate having an average degree of polymerization of 2 was added. They were reacted with stirring for 5 minutes at atmospheric pressure and then for 15 minutes at a pressure of about 1.0 mmHg to afford a polymer having an intrinsic viscosity of 0.59 and a terminal carboxyl group content of 3 equivalents/$10^6$ g.

The polymer was pelletized to form chips, and then dried. One hundred parts of the resulting dry chips were dry-blended with a predetermined amount of each of the bis-cyclic imino esters indicated in Table 8. The mixture was extruded by an extruder at about 280° C. with an average residence time of 3 minutes. The properties of the polymers obtained are shown in Table 8.

For comparison, the above procedure was repeated except that the cyclic bis-cyclic imino ester was not added. The results are also shown in Table 8.

TABLE 8

| | | Properties of the polymer | |
|---|---|---|---|
| Example | Bis-cyclic imino ester (parts) | Intrinsic viscosity | Terminal COOH content (equivalents/$10^6$ g) |
| 46 | 2,2'-bis(3,1-benzoxazin-4-one) (1.0) | 0.98 | 4 |
| 47 | 2,2'-bis(3,1-benzoxazin-4-one) (1.5) | 1.08 | 5 |
| 48 | 2,2'-p-phenylenebis(3,1-benzoxazin-4-one) (1.5) | 0.74 | 5 |
| Comp. Ex. 8 | None | 0.55 | 6 |

EXAMPLES 49 TO 53 AND COMPARATIVE EXAMPLE 9

One thousand parts of polytetramethylene terephthalate having an intrinsic viscosity of 0.73 and a terminal carboxyl group content of 36 equivalents/$10^6$ g was melted in a stream of nitrogen at about 245° C. in a polymerization vessel. Then, 10 parts of polyethylene malonate having an intrinsic viscosity of 0.16 was added, and they were reacted with stirring for 5 minutes under atmospheric pressure, and then for 15 minutes at a reduced pressure of about 1.0 mmHg to afford a polymer having an intrinsic viscosity of 0.72 and a terminal carboxyl group content of 4 equivalents/$10^6$ g.

The resulting polymers were pelletized to form chips, and dried. One hundred parts of the dry chips were dry-blended with a predetermined amount of each of the bis-cyclic imino esters indicated in Table 9, and the mixture was extruded by an extruder at about 245° C. with an average residence time of 2 minutes. The properties of the polymers obtained are shown in Table 9.

For comparison, the above procedure was repeated except that the bis-cyclic imino ester was not added. The results are also shown in Table 9.

TABLE 9

| Example | Bis-cyclic imino ester (parts) | Properties of the polymer Intrinsic viscosity | Terminal COOH content (equivalents/$10^6$ g) |
|---|---|---|---|
| 49 | 2,2'-p-phenylene(4,4-dimethyl-5(4H)oxazolone) (1.0) | 1.13 | 9 |
| 50 | 2,2'-p-phenylenebis(4-isobutyl-5(4H)oxazolone) (1.0) | 1.10 | 9 |
| 51 | 2,2'-p-phenylenebis(5(4H)-oxazolone) (1.2) | 1.03 | 10 |
| 52 | 2,8-dimethyl-4H,6H-benzo[1,2-d:4,5-d']bis[1,3]oxazine-4,6-dione (1.0) | 1.02 | 8 |
| 53 | 6,6'-methylenebis(2-methyl-4H,3,1-benzoxazin-4-one) (1.3) | 0.91 | 10 |
| Comp. Ex. 9 | None | 0.70 | 10 |

EXAMPLE 54

One hundred parts of polyethylene terephthalate having an intrinsic viscosity of 0.57 and a terminal carboxyl group content of 29 equivalents/$10^6$ g was dried and then melted at about 280° C. in a polymerization vessel. Then, 3 parts of ethylene carbonate was added, and with stirring, they are reacted for 10 minutes under atmospheric pressure and then for 30 minutes at a reduced pressure of about 0.5 mmHg. The resulting polymer had an intrinsic viscosity of 0.59 and a terminal carboxyl group content of 6 equivalents/$10^6$ g. Then, 1.2 parts of 2,2'-bis(3,1-benzoxazin-4-one) was added, and reacted with stirring in a stream of nitrogen. The degree of polymerization of the polymer rapidly increased. Specifically, its intrinsic viscosity increased to 1.13 in 2 minutes, to 1.21 as a maximum in 5 minutes, and to 1.18 in 15 minutes.

EXAMPLES 55 TO 57 AND COMPARATIVE EXAMPLE 10

One hundred parts of polyethylene terephthalate having an intrinsic viscosity of 0.49 and a terminal carboxyl group content of 6 equivalents/$10^6$ g was dry-blended with 2,2'-bis(3,1-benzoxazin-4-one) in the amounts indicated in Table 10. The mixture was melt-kneaded and extruded into pellets at each of the temperatures and with each of the residence times indicated in Table 10. The proportion of the cyclic imino ester in the resulting polymer is shown in Table 10.

The pellets were dried and then injection-molded at an injection temperature of 295° C. with a cycle time of about 1 minute. The intrinsic viscosities of the resulting molded articles are shown in Table 10.

For comparison, the above procedure was repeated except that 2,2'-bis(3,1-benzoxazin-4-one) was not added. The results are also shown in Table 10.

TABLE 10

| Example | Amount of 2,2'-bis(3,1-benzoxazin-4-one) (parts) | Mixing conditions Temp. (°C.) | Time (sec.) | Proportion of the cyclic imino ester (eq./$10^6$ g) | Intrinsic viscosity of the molded article |
|---|---|---|---|---|---|
| 55 | 1.5 | 265 | 70 | 57 | 0.98 |
| 56 | 1.2 | 260 | 80 | 37 | 0.92 |
| 57 | 1.0 | 255 | 60 | 43 | 0.90 |
| Comp. Ex. 10 | — | — | — | — | 0.47 |

EXAMPLES 58 TO 60 AND COMPARATIVE EXAMPLE 11

One hundred parts of polytetramethylene terephthalate block copolymer having copolymerized therewith about 60% by weight of polyoxytetramethylene glycol having an average molecular weight of about 2,000 (intrinsic viscosity 0.73; terminal COOH content 11 equivalents/$10^6$ g) was dry blended with a predetermined amount of each of the bis-cyclic imino esters shown in Table 11. Then, the mixture was melt-kneaded and extruded into pellets at each of the temperatures with each of the average residence times shown in Table 11. The proportion of the cyclic imino ester groups in each of the polymer pellets obtained is shown in Table 11.

The polymer pellets were dried, and injectionmolded at an injection temperature of about 240° C. with a cycle time of about 1 minute. The intrinsic viscosity of each of the molded articles is shown in Table 11.

For comparison, the original polytetramethylene terephthalate block copolymer was directly molded under the same conditions as above. The results are also shown in Table 11.

TABLE 11

| Example | Bis-cyclic imino ester compound | Amount added (parts) | Mixing conditions Temp. (°C.) | Time (sec.) | Proportion of the cyclic imino ester groups (eq./$10^6$ g) | Intrinsic viscosity of the molded article |
|---|---|---|---|---|---|---|
| 58 | 2,2'-p-phenylenebis[4,4'-dimethyl-5(4H)-oxazolone] | 1.3 | 200 | 120 | 61 | 1.03 |
| 59 | 2,2'-p-phenylenebis[5(4H) oxazolone] | 1.3 | 210 | 90 | 64 | 0.97 |
| 60 | 2,8-dimethyl-4H,6H-benzo[1,2-d:5,4-d']bis[1,3]-oxazine-4,6-dione | 1.5 | 205 | 100 | 65 | 0.98 |
| Comp. Ex. 11 | None | — | — | — | — | 0.70 |

EXAMPLES 61 TO 65 AND COMPARATIVE EXAMPLE 12

One hundred parts of each of the thermoplastic resins shown in Table 12 was dry blended with 2,2'-bis(3,1-benzoxazin-4-one) in the amounts indicated in Table 12. The mixture was melted and extruded into chips by an extruder at each of the resin temperatures shown in Table 12 with an average residence time of about 1 minute.

The resulting master chips in each of the amounts indicated in Table 13 were dry blended with 100 parts of polyethylene terephthalate having an intrinsic viscosity of 0.63. The mixture was dried, and extruded by an extruder through a T-die into a sheet having a thickness of about 100 microns at a polymer temperature of about 270° C. with an average residence time of about 3 minutes. The intrinsic viscosities of the resulting sheets are shown in Table 13.

For comparison the above procedure was repeated except that the master chips were not added. The results are also shown in Table 13.

It is seen from Table 13 that while the intrinsic viscosity of the sheet in Comparative Example 12 decreased, the intrinsic viscosities of the sheets obtained by the process of this invention markedly increased.

TABLE 12

| Example | Type of thermoplastic resin | Amount of 2,2'-bis (3,1-benzo-xazin-4-one) (parts) | Dry-blending temperature (°C.) |
|---|---|---|---|
| 61 | Polyethylene terephthalate (intrinsic viscosity 0.63) | 8 | 255 |
| 62 | Polyethylene terephthalate (intrinsic viscosity 0.63) | 12 | 255 |
| 63 | Polybutylene terephthalate (intrinsic viscosity 0.73) | 10 | 230 |
| 64 | Polybutylene terephthalate (intrinsic viscosity 0.73) | 20 | 230 |
| 65 | 2,2'-bis(4-hydroxyphenyl)propane polycarbonate (Panlite L-1250, registered trademark) | 10 | 260 |
| Comp. Ex. 12 | — | — | — |

TABLE 13

| Example | Amount of master chips (parts) | Viscosity of the Sheet |
|---|---|---|
| 61 | 12 | 1.04 |
| 62 | 8 | 1.02 |
| 63 | 8 | 0.92 |
| 64 | 5 | 0.95 |
| 65 | 10 | 0.98 |
| Comp. Ex. 12 | — | 0.61 |

EXAMPLES 66 AND 67 AND COMPARATIVE EXAMPLE 13

One hundred parts of each of the thermoplastic resins shown in Table 14 was dry blended with 2,2'-p-phenylenebis[4,4-dimethyl-5(4H)-oxazolone] in the amounts indicated in Table 14. The mixture was melt-extruded at each of the polymer temperatures shown in Table 14 with an average residence time of about 1 minute by an extruder, to obtain master chips.

The master chips in each of the amounts indicated in Table 15 were dry blended with 100 parts of polytetramethylene terephthalate having an intrinsic viscosity of 0.71. The mixture was dried, and melt-extruded through a T-die into a sheet having a thickness of about 200 microns using an extruder at a polymer temperature of about 250° C. with an average residence time of about 2.5 minutes. The intrinsic viscosities of the resulting sheets are shown in Table 15.

For comparison, the above procedure was repeated except that the master chips were not added. The results are also shown in Table 15.

It is seen from Table 15 that the sheets obtained by the process of this invention have an increased intrinsic viscosity.

TABLE 14

| Example | Thermoplastic resin | Amount of 2,2'-p-phenylenebis 4,4-dimethyl-5 (4H)-oxazo-lone (parts) | Dry blending temperature (°C.) |
|---|---|---|---|
| 66 | Polyethylene terephthalate having 15% of isophthalic acid copolymerized therewith (intrinsic viscosity 0.65) | 15 | 250 |
| 67 | Polytetramethylene terephthalate (intrinsic viscosity 0.73) | 20 | 230 |
| Comp. Ex. 13 | None | — | — |

TABLE 15

| Example | Amount of the master chips (parts) | Intrinsic viscosity of the sheet |
|---|---|---|
| 66 | 7 | 1.14 |
| 67 | 5 | 1.09 |
| Comp. Ex. 13 | — | 0.69 |

EXAMPLES 68 AND 69 AND COMPARATIVE EXAMPLE 14

960 Parts of polyethylene terephthalate having an intrinsic viscosity of 0.65 and a terminal carboxyl group content of 35 equivalents/$10^6$ g was melted in a stream of nitrogen in a polymerization vessel, and then 9.6 parts of polyethylene oxalate having an average degree of polymerization of 2 was added. They were reacted with stirring for 5 minutes under atmospheric pressure and then for 15 minutes under a reduced pressure of 1.0 mmHg to afford a polymer having an intrinsic viscosity of 0.62 and a terminal carboxyl group content of 3 equivalents/$10^6$ g. The polymer was pelletized into chips, and dried, and then melt-extruded by an extruder at a polymer temperature of 280° C. with an average residence time of about 3 minutes to afford a sheet having a thickness of about 300 microns, an intrinsic viscosity of 0.60 and a terminal carboxyl group content of 6 equivalents/$10^6$ g.

The sheet was dipped in a solution of each of the cyclic imino esters shown in Table 16 in xylene and treated for 60 minutes at the boiling point of the solvent to impregnate the sheet with the cyclic imino ester. The sheet was then dried, and heat-treated in an atmosphere of nitrogen at 235° C. for 2 hours. The intrinsic viscosities of the heat-treated sheets are shown in Table 16.

For comparison, the above sheet before the dipping treatment was heat-treated in the same way as above. The results obtained are also shown in Table 16.

TABLE 16

| Example | Cyclic imino ester | Concentration of the xylene solution (wt. %) | Intrinsic viscosity of the sheet after impregnation | Intrinsic viscosity of the sheet after heat-treatment |
|---|---|---|---|---|
| 68 | 2,2'-bis(3,1-benzoxazin-4-one) | 0.2 | 0.58 | 1.06 |
| 69 | 2,2'-p-phenylenebis(4,4-dimethyl-5(4H)-oxazolone) | 0.3 | 0.59 | 0.93 |
| Comp. Ex. 14 | — | — | — | 0.52 |

It is seen from Table 16 that the sheets impregnated with the cyclic imino ester had markedly increased degree of polymerization.

EXAMPLES 70 TO 72

One hundred parts of chips of polyethylene terephthalate having an intrinsic viscosity of 0.53 and containing terminal hydroxyl groups in a concentration of 85% based on the entire terminal groups was dry blended with 2,2'-bis(3,1-benzoxazin-4-one) in the amounts indicated in Table 17. The mixture was melt-spun at a molten polymer temperature of 300° C. with an average residence time of about 5 minutes using a spinning mantle having a spinneret with 36 spinning orifices of 0.5 mm in diameter and a heating zone immediately below the spinnert.

The resulting undrawn filaments were drawn at a draw ratio of 3.60 at a temperature of 90° C., and then at a draw ratio of 1.50 at a temperature of 200° C., and then heat treated at 220° C. under tension.

The intrinsic viscosities and tenacities of the drawn filaments are shown in Table 17.

TABLE 17

| Example | Amount of 2,2'-bis(3,1-benzoxazin-4-one) (parts) | Drawn filaments Intrinsic viscosity | Drawn filaments Tenacity (g/de) |
|---|---|---|---|
| 70 | 0.8 | 0.85 | 8.82 |
| 71 | 1.0 | 0.90 | 9.03 |
| 72 | 1.2 | 0.93 | 9.24 |

What we claim is:

1. A process for producing an aromatic polyester having an increased degree of polymerization which comprises reacting a hydroxyl-terminated, substantially linear, fiber-forming aromatic polyester having an aromatic dicarboxylic acid as a main acid component at an elevated temperature with a bis-cyclic imino ester compound of the formula

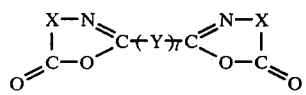 (I)

wherein Y represents a divalent hydrocarbon group which may further contain a hetero atom, X represents a divalent hydrocarbon group which contains 1 or 2 carbon atoms as members of the above imino ester ring and is non-reactive under the reaction conditions, and l is 0 or 1, or of the following formula

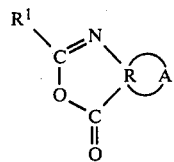 (II)

wherein A represents a grouping of the formula

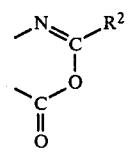 (II)-a in which $R^2$ represents a monovalent hydrocarbon group, or a grouping of the formula

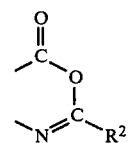 (II)-b in which $R^2$ is as defined above, R represents a tetravalent aromatic group which may further contain a hetero atom, and $R^1$ represents a monovalent aromatic hydrocarbon which is identical to or different from $R^2$;
thereby bonding the molecular chains of the aromatic polyester to each other by the terminal hydroxyl groups thereof and forming rapidly said aromatic polyester having an increased degree of polymerization.

2. The process of claim 1 wherein said bis-cyclic imino ester compound is used in a proportion of 0.05 to 2 moles per equivalent of the terminal hydroxyl groups of said aromatic polyester.

3. The process of claim 2 wherein said bis-cyclic imino ester compound is used in a proportion of 0.1 to 1 mole per equivalent of the terminal hydroxyl groups of said aromatic polyester.

4. The process of claim 1 wherein in formula [I] representing said bis-cyclic imino ester compound, X is an aromatic hydrocarbon group which may be substituted by a substituent non-reactive under the reaction conditions.

5. The process of claim 4 wherein in formula [I] representing said bis-cyclic imino ester compound, l is 0, in which case the two imino ester rings are bonded to each other directly.

6. The process of claim 1 wherein said aromatic polyester contains terminal hydroxyl groups in a concentration of at least 50 equivalent % based on the entire terminal groups thereof.

7. The process of claim 1 wherein said reaction is carried out at atmospheric pressure or elevated pressures at a temperature at which said aromatic polyester is melted, or at a higher temperature.

8. The process of claim 7 wherein said reaction is carried out in a melt-molding machine.

9. The process of claim 8 wherein said aromatic polyester contains said bis-cyclic imino ester in the unreacted state.

10. The process of claim 8 wherein said reaction is carried out by mixing said aromatic polyester with another thermoplastic polymer containing said bis-cyclic imino ester compound in the unreacted state at a temperature above the melting point of said thermoplastic polymer and said aromatic polyester.

11. A process for producing an aromatic polyester having an increased degree of polymerization, which comprises reacting a substantially linear, fiber-forming aromatic polyester containing terminal carboxyl groups and having an aromatic dicarboxylic acid as a main acid component at an elevated temperature with a carboxyl content reducing agent capable of reacting with said terminal carboxyl groups to form terminal hydroxyl groups and a bis-cyclic imino ester of the formula

  (I)

wherein Y represents a divalent hydrocarbon group which may further contain a hetero atom, X represents a divalent hydrocarbon group which contains 1 or 2 carbon atoms as members of the above imino ester ring and is non-reactive under the reaction conditions, and l is 0 or 1, or of the following formula

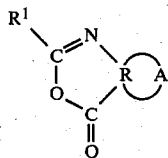  (II)

wherein A represents a grouping of the formula

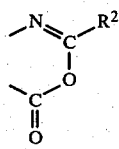  (II)-a in which $R^2$ represents a monovalent hydrocarbon group, or a grouping of the formula

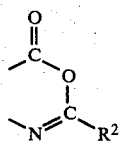  (II)-b in which $R^2$ is as defined above, R represents a tetravalent aromatic group which may further contain a hetero atom, and $R^1$ represents a monovalent aromatic hydrocarbon which is identical to or different from $R^2$; thereby converting the terminal carboxyl groups of said aromatic polyester to terminal hydroxyl groups by said carboxyl content reducing agent and bonding the molecular chains of the aromatic polyesters to each other by the terminal hydroxyl groups, and when low boiling volatile components are formed as by-products during the conversion of the carboxyl groups to the terminal hydroxyl groups, reacting at least said carboxyl content reducing agent and said aromatic polyester in the molten state, thereby forming said aromatic polyester having an increased degree of polymerization rapidly.

12. The process of claim 11 wherein said carboxyl content reducing agent is a monoepoxy compound.

13. The process of claim 11 wherein said carboxyl content reducing agent is an alkylene carbonate, a polyalkylene oxalate, a polyalkylene malonate, or a diglycol ester of oxalic or malonic acid.

14. The process of claim 11 wherein said aromatic polyester having terminal carboxyl groups is reacted with said carboxyl content reducing agent at an elevated temperature to convert them to terminal hydroxyl groups, and then said aromatic polyester having the terminal hydroxyl groups is reacted with said bis-cyclic imino ester.

15. A process for producing a molded article composed of an aromatic polyester having an increased intrinsic viscosity, which comprises mixing a hydroxyl-terminated, substantially linear aromatic polyester having an intrinsic viscosity, measured in o-chlorophenol at 35° C., of at least 0.3 and derived from terephthalic acid as a main acid component and ethylene glycol as a main glycol component, with 0.1 to 1 mole, per equivalent of the terminal hydroxyl groups of said aromatic polyester, of 2,2'-bis(3,1-benzoxazin-4-one) of the formula

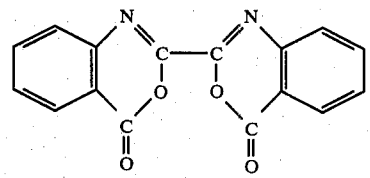

in a melt-molding machine at a temperature above the melting point of said aromatic polyester, thereby bonding the molecular chains of said aromatic polyester to each other by the terminal hydroxyl groups.

16. The process of claim 15 wherein said aromatic polyester is polyethylene terephthalate.

17. A process for producing an aromatic polyester having an increased intrinsic viscosity, which comprises mixing a hydroxyl-terminated, substantially linear aromatic polyester having an intrinsic viscosity, measured in o-chlorophenol at 35° C. of at least 0.3 and derived from terephthalic acid as a main acid component and an alkylene glycol having 3 to 6 carbon atoms as a main glycol component, with 0.1 to 1 mole, per equivalent of the terminal hydroxyl groups of said aromatic polyester, of at least one member selected from the group consisting of 2,2'-bis(3,1-benzoxazin-4-one), 2,2'-p-phenylenebis[4,4-dimethyl-5(4H)-oxazolone], 2,2'-m-phenylenebis[4,4-dimethyl-5(4H)-oxazolone], 2,2'-p-phenylenebis[3,1-benzoxazin-4-one], 2,2'-p-phenylenebis[4-isobutyl5(4H)-oxazolone], 2,8-dimethyl-4H,6H-benzo(1,2-d:5,4-d')bis(3,1)oxazine-4,6-dione, 2,7-dimethyl-4H,6H-benzo(1,2-d:4,5-d')bis(1,3)oxazine-4,9-dione, and 6,6'-bis(2-methyl-4H,3,1-benzoxazin-4-one) in a melt-molding machine at a temperature above the melting point of said aromatic polyester, thereby bonding the molecular chains of said aromatic polyester to each other by the terminal hydroxyl groups.

18. The process of claim 15 wherein said aromatic polyester is polytetramethylene terephthalate.

19. An aromatic polyester of a high degree of polymerization produced by the process of claim 1.

20. A molded article composed of the aromatic polyester of claim 19.

21. A molded article prepared by the process of any one of claims 15 to 18.

22. The molded article of claim 20 which is in the form of fiber or film.

23. A molded article in the form of fiber or film prepared by the process of any one of claims 15 to 18.

24. An aromatic polyester of a high degree of polymerization produced by the process of claim 11.

25. A molded article composed of the aromatic polyester of claim 24.

26. The molded article of claim 25 which is in the form of fiber or film.

* * * * *